Feb. 13, 1951          J. RENAUD          2,541,286
ADJUSTMENT DEVICE FOR THE FREQUENCY OF SPIRAL BALANCES
Filed May 26, 1947
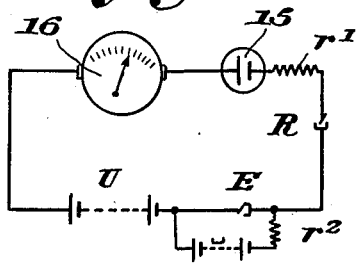
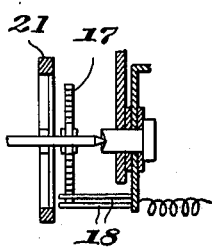
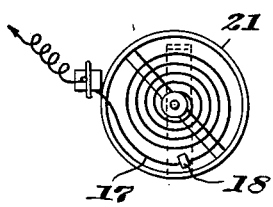
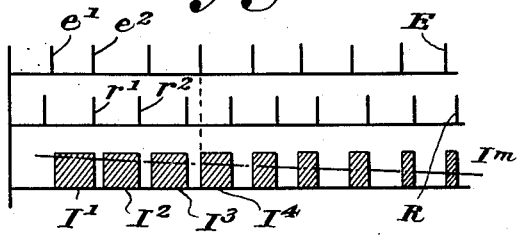
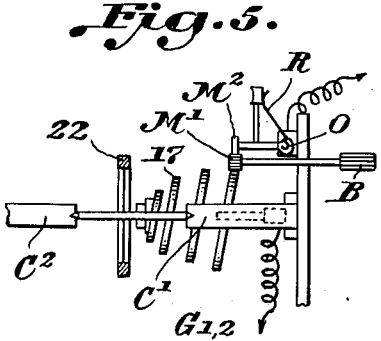
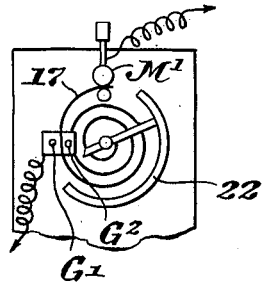
INVENTOR
JEAN RENAUD
BY Wenderoth, Lind & Ponack
ATTORNEYS Patented Feb. 13, 1951

2,541,286

UNITED STATES PATENT OFFICE 2,541,286

ADJUSTMENT DEVICE FOR THE FREQUENCY OF SPIRAL BALANCES

Jean Renaud, Paris, France, assignor to Compagnie Industrielle de Mecanique Horlogere, Puteaux, France Application May 26, 1947, Serial No. 750,600
In France June 21, 1946

5 Claims. (Cl. 73—6)

This invention relates to an adjusting method and device for the adjustment of the frequency of oscillation of the balance of time movements and other apparatuses.

Adjusting devices are already known for the adjustment of the frequency of oscillation of the balance of time movements, which devices are intended for adjusting the oscillation frequency of the balance to a predetermined value.

This adjustment is generally effected through adjusting the length of the hairspring which is made purposely too long in the manufacture and consists in comparing the oscillation of the balance to be adjusted with that of the standard balance.

For this purpose, it is known to superpose both balances while causing the arms to coincide, whereafter an equivalent impulse is imparted to said balances. If the frequency at which the balance under examination oscillates is different from that of the standard the respective arms of the balances move progressively out of register with each other. If both arms of the balances remain superimposed the frequency of the oscillations of the balances is the same.

It is also known to count during a predetermined time the number of oscillations of the balance to be adjusted.

Whatever the apparatuses may be which are used said methods require a very long time of adjustment owing to the fact that one proceeds by successive approximations. Furthermore, the precision of the adjustment depends largely on the skill of the operator. Visual tiredness results therefrom, on the other hand.

Another method is also known for comparing the working of two time movements, said method consisting in converting the deviation between the balance to be adjusted and the standard balance into electric impulses the duration of which is proportional to the deviation so that if the oscillations of both balances have the same value the mean value of the current remains constant, while it increases or becomes smaller, according to the case, if the oscillation frequencies are different.

Said known method leads to very complicated devices in which two electronic relays or thyratron tubes are used, which are controlled through the currents produced in microphones and sufficiently amplified.

The present invention has, more particularly, for its object to provide a device for the application of the preceding method to the adjustment of the oscillation frequency of a balance while doing away with said inconveniences.

For this purpose, the invention relates to an adjustment device for adjusting the oscillation frequency of balances in which the deviation between the balance to be adjusted and the standard balance is converted into electric impulses, the electric impulses produced by one of the balances releasing an electronic current while the electric impulses produced by the other balance cut off said current; the mean value of the so produced currents depends on the deviation between two impulses so that if the oscillations of both balances have the same value the mean current remains constant while it increases or becomes smaller, according to the case, if the oscillation frequencies are different, said device made according to the invention being characterized by a relay mounted in series with electric contacts controlled by each balance and a measuring instrument for measuring the electric current.

A device made according to the invention is shown by way of example in the drawings, in which:

Figure 1 is a diagrammatic view showing one form of execution of the device.

Figures 2 and 3 are respectively a cross sectional view with parts in elevation and a front elevational view of the electronic contact device of the hairspring.

Figure 4 is a diagram showing the current impulses of the device of Figure 1, and Figures 5 and 6 are respectively a cross sectional view with parts in elevation and an elevational view showing the device for adjusting the length of the hairspring.

The device for the adjustment of the oscillation frequency of a balance in which the variation of a mean current produced between the current impulse imparted by one of the balances and the current impulse imparted by the other balance is examined, is shown in Figure 1.

The balance to be adjusted controls an electric contact R opening during a very short time when the balance passes through its balanced position. Likewise, the standard balance controls an electric contact E opening during a very short time when the balance passes through its balanced position.

Said device is made in following manner.

A neon tube 15 is connected in series with a protecting resistor $r_1$ and the tripping voltage of which is $U+u$. The maintenance voltage U is mounted in series with a micro-ammeter 16 and the contact R of the hairspring to be adjusted across a D. C. source of voltage U mounted in series with a source of D. C. voltage $u$.

The voltage source $u$ is shunted about the contact E of the standard balance. A resistor $r^2$ is mounted in series for avoiding short-circuiting the voltage $u$.

The device works as follows:

At each oscillation of the standard balance the contact E which is open during a short time causes both voltages U and $u$ to work in series and the neon lamp is fired. The current is established in the circuit and persists in spite of the closing of E. But the circuit is cut off at each oscillation of the system to be adjusted owing to the opening of R.

It may thus be seen that impulses flow through the circuit the duration of which is equal to the time elapsing between the opening of E and the opening of R (Figure 4). The micro-ammeter having a coil with a moving frame which is very strongly damped indicates the mean current which flows through the same.

Figure 4 indicates according to both upper lines the opening and closing operations of the electric contacts E and R as a function of the time. The second lower line of Figure 4 gives the duration I of the electric impulses as a function of the closing and opening operations of contacts E and R.

Thus, by way of example, contact E opens at the time $e_1$, contact R being already closed, the neon lamp which is fed through the sum of the voltages $U+u$ fires and the current flows through the neon lamp 15 and, accordingly, through the measuring instrument 16 till the moment of the opening of contact R at the time $r_1$. Contact R immediately closes again and a new impulse of current $I_2$ will appear when contact E will open at the time $e_2$ in order to last till the opening of R till the time $r_2$ and so on for the successive impulses $I_3$, $I_4$ etc.

If the duration of the impulses varies, then the mean current $Im$ indicated by the micro-ammeter 16 also varies and the direction of the deflection of the pointer indicates the direction of the variation in the deviation between both systems.

The electric contacts E, R are the contacts which are produced between the blade of the hairspring 17 and pins 18 which are insulated electrically and encompass said blade (said pins being identical with the curb-pin with which any hairspring balance system of a timing device is provided), the blade having a certain oscillation allowed between said pins (Figures 2 and 3).

Although the duration of opening of the contacts is very short, the resistor $r^2$ is calculated so that the voltage drop $r^2 \times I$ produced therein is equal to $u$ so that even during the opening of E the neon tube, once fired, is supplied with the maintenance voltage U.

In Figs. 2 and 3 the balance cooperating with the hairspring 17 is shown at 21 and in Figs. 5 and 6 the balance is indicated at 22.

In order to facilitate the adjustment the system to be adjusted: axis-balance-hairspring is placed between two step-bearings $C^1$ and $C^2$ one of which is retractably mounted. The free end of the hairspring is clamped between two knurled wheels $M^1$, $M^2$, $M^2$ being movable around an axis O but constantly engaging $M^1$ under the action of the spring R. The last turn comes to lie between the pins $G^1$, $G^2$ which are insulated electrically from the remainder of the device and form the contact of Figure 5.

A manual impulse is imparted to the system which oscillates freely.

The direction of the deflection of the pointer is then observed on the micro-ammeter and the knob B keyed on the axis of the knurled wheel $M^1$ is turned in the proper direction until the pointer appears to be stationary whatever the position of the same on the dial may be. The oscillation frequency of the system to be adjusted is then equal to that of the standard system.

By means of a lever (not shown) a bend is then marked on the hairspring indicating the place where the hairspring is to be secured to the time-movement and, by means of the same lever the part of the hairspring which is not used is cut off.

Although the amplitude of the oscillations of the balance to be adjusted varies during the adjustment the isochronism of said oscillations is insured by the fact that the pins $G^1$ and $G^2$ which are made of a suitable metal have a small diameter for a comparatively great length so that they can undergo a slight bending in the radial direction under the resting of contacting force of the hairspring.

This bending, combined with the elastic deformation of the hairspring causes a "compensation" through which the period of oscillation of the balance-hairspring system is rendered practically independent of its amplitude within very large limits.

Although, as a rule, the standard used is a time-movement of the type for which the adjustment of the balance hairspring is effected and the index of which (Figure 2) is insulated electrically it is also possible to use, for this purpose, any time-movement provided with a contact answering the requirements indicated above.

The above described device makes it possible to use a very rapid and accurate method with means which are extremely simple.

Furthermore, the intensity of the current which flows through the circuit can be reduced, by properly selecting the type of neon tube, to an extremely small value (of the order of 0.1 ma.) which is not capable of impairing the contacts E and R, which makes it possible to use the method for the most delicate hairsprings.

I claim:

1. In an adjustment device for the frequency of spiral balances, a first source of electrical voltage, a second source of electrical voltage in series with said first source, a relay fed by said two sources, a standard balance, a first electrical contact located at a predetermined place in the stroke of the balance to be adjusted and placed in series in the circuit of said relay to close said circuit and open it during a very short time interval at the moment when the balance to be adjusted acts upon it during a slight fraction of its stroke, a second electrical contact placed at a predetermined place in the stroke of said standard balance shunting said second electrical source and eliminating said shunt during a very short time at the moment when said standard balance acts upon it during a slight fraction of its stroke so that at this moment said relay is energized by the sum of the voltages of said two sources and then insures the closing of the electric circuit because of the action of said first source as long as the balance to be adjusted has not opened the contact which it controls, the duration of said impulse depending on the deviation between the moment at which the standard balance passes on its contact and the moment at which the balance to be adjusted passes on its contact, and an electric measuring instrument for measuring the mean current flow through the circuit.

2. In an adjustment device for the frequency of spiral balances, a first source of electrical voltage, a second source of electrical voltage in series with said first source, a neon tube fed by said two sources, a standard balance, a first electrical contact located at a predetermined place in the stroke of the balance to be adjusted and placed in series in the firing circuit of said neon tube to close said circuit and open it during a very short time at the moment when the balance to be adjusted acts upon it during a slight fraction of its stroke, a second electric contact placed at a predetermined place in the stroke of said standard balance shunting said second electrical source and eliminating said shunt during a very short time at the moment when said standard balance acts upon it during a slight fraction of its stroke so that at this moment said neon tube is fed under its tripping voltage given by the sum of the voltages of said two sources and then remains energized under its maintenance voltage owing to the action of said first source so long as the balance to be adjusted has not opened the contact which it controls, and an electrical measuring instrument for measuring the average current which flows through the electric circuit and indicating the average current flowing through said circuit.

3. In an adjustment device for the frequency of spiral balances, a first source of electric voltage, a second source of electric voltage connected in series with the first one, a neon lamp fed through both sources, a measuring instrument for measuring the current which flows through the feeding circuit of the neon lamp connected in series with said neon lamp a standard balance, a first electric contact in a predetermined place of the stroke of the balance to be adjusted and connected in series in the feeding circuit of the neon lamp and of the measuring instrument for closing said circuit and opening it during a very short time at the moment when the test balance acts thereon during a small fraction of its stroke, a second electric contact in a predetermined place in the stroke of the standard balance, an electric resistor in series with the source of voltage so that the closing of electric contact of the standard balance connects the electric source with said resistor whereas the opening of said electric contact of the standard balance eliminates this shunt and connects said source of electric voltage with resistor in series with the first source of electric voltage so that at this moment the neon lamp is fed with its tripping voltage given through the sum of the voltage of both sources and remains energized under its maintenance voltages owing to the action of the first source so long as the test balance did not open the contact which it controls.

4. In an adjustment device for the frequency of spiral balances, a first source of electric voltage, a second source of electric voltage connected in series with the first one, a neon lamp fed through both sources, a measuring instrument for measuring the current which flows through the feeding circuit of the neon lamp connected in series with said neon lamp, a standard balance, two pins clamping one turn of the test balance and closing the electric contact connected in series with the feeding circuit of the neon lamp, said contact being cut off owing to the deformation of the spiral when the test balance passes to a certain elongation and then opening the feeding circuit of the neon lamp during a very short time and closing it during the rest of the time of each cycle of oscillations of said balance, a resistor in series with the second feeding voltage, two pins clamping one turn of the spiral of the standard balance and closing the electric circuit shunting the second voltage and resistor, the contact being cut off owing to the deformation of the spiral when the balance passes to a certain elongation which then eliminates the shunting of the second electric source so that at this moment the neon lamp is fed with its tripping voltage given through the sum of the voltages of both sources and then remains energized with its maintenance voltage owing to the action of the first source so long as the test balance did not open the contact which it controls.

5. In an adjustment device for the frequency of spiral balances, a first source of electric voltage, a second source of electric voltage connected in series with the first one, a neon lamp fed through both sources, a measuring instrument for measuring the current which flows through the feeding circuit of the neon lamp connected in series with said neon lamp, a standard balance, two pins which may undergo slight flexions, clamping one turn of the test balance and closing the electric contact connected in series with the feeding circuit of the neon lamp, said contact being cut off owing to the deformation of the spiral when the test balance passes to a certain elongation and then opening the feeding circuit of the neon lamp during a very short time and closing it during the rest of the time of each cycle of oscillations of said balance, a resistor in series with the second feeding voltage, two pins which may undergo slight flexions, clamping one turn of the spiral of the standard balance and closing the electric circuit shunting the second voltage and resistor, the contact being cut off owing to the deformation of the spiral when the balance passes to a certain elongation which then eliminates the shunting of the second electric source so that at this moment the neon lamp is fed with its tripping voltage given through the sum of the voltages of both sources and then remains energized with its maintenance voltage owing to the action of the first source so long as the test balance did not open the contact which it controls.

JEAN RENAUD.

REFERENCES CITED

The following references are of record in the file of this patent:

UNITED STATES PATENTS

| Number | Name | Date |
|---|---|---|
| 2,019,769 | Poole | Nov. 5, 1935 |
| 2,227,858 | Knobel | Jan. 7, 1941 |
| 2,340,575 | Auble | Feb. 1, 1944 |